United States Patent [19]
Stange

[11] Patent Number: 5,493,629
[45] Date of Patent: Feb. 20, 1996

[54] LIQUID CORE HEAT EXCHANGERS FOR FIBER OPTIC SENSING AND METHOD USING SAME

[75] Inventor: William A. Stange, Huber Heights, Ohio

[73] Assignee: The United States of America as represented by the Secretary of the Air Force, Washington, D.C.

[21] Appl. No.: 273,442

[22] Filed: Jul. 5, 1994

[51] Int. Cl.$^6$ .............................. G02B 6/02; G02B 6/00
[52] U.S. Cl. .......................... 385/125; 385/12; 385/123
[58] Field of Search ................................ 385/12, 15, 27, 385/28, 123, 125

[56] References Cited

U.S. PATENT DOCUMENTS

| | | | |
|---|---|---|---|
| 3,582,187 | 6/1971 | Skillman | 385/125 X |
| 3,582,907 | 6/1971 | Taylor | 385/125 X |
| 3,647,277 | 3/1972 | Kaminow | 385/125 X |
| 3,819,250 | 6/1974 | Kibler | 385/39 X |
| 3,894,788 | 7/1975 | Grambling et al. | 385/125 X |
| 3,944,811 | 3/1976 | Midwinter | 385/125 X |
| 4,201,446 | 5/1980 | Geddes et al. | 385/125 X |
| 4,685,766 | 8/1987 | Nishimura et al. | 385/125 X |
| 4,747,662 | 5/1988 | Fitz | 385/125 X |
| 4,839,515 | 6/1989 | Kershaw | 385/125 X |
| 4,927,231 | 5/1992 | Levatter | 385/125 X |
| 4,928,006 | 5/1990 | Kershaw | 250/201.1 |
| 4,950,885 | 8/1990 | Kershaw | 250/227.25 |
| 5,165,773 | 11/1992 | Nath | 362/32 |

FOREIGN PATENT DOCUMENTS

| | | | |
|---|---|---|---|
| 54-25745 | 2/1979 | Japan | 385/125 X |

OTHER PUBLICATIONS

Kuribara et al., Liquid Core Optical Fiber for Voltage Measurement Using Kerr Effect, Electronics Letters, vol. 19, 1983, pp. 133–135 (no month).

*Primary Examiner*—Brian Healy
*Attorney, Agent, or Firm*—Fredric L. Sinder; Thomas L. Kundert

[57] ABSTRACT

A new liquid-core fiber optic system adds a pump and a heat exchanger to flow the transparent liquid core through the optical fiber. Flowing the transparent liquid through the core of the optical fiber allows heating and cooling of substances in thermal contact with the optical fiber. The invention also includes measuring the temperature, strain or other parameters of the optical fiber at the same time as flowing the transparent liquid core.

3 Claims, 1 Drawing Sheet

LIQUID CORE HEAT EXCHANGERS FOR FIBER OPTIC SENSING AND METHOD USING SAME

RIGHTS OF THE GOVERNMENT

The invention described herein may be manufactured and used by or for the Government of the United States for all governmental purposes without the payment of any royalty.

BACKGROUND OF THE INVENTION

The present invention relates generally to fiber optics, and more specifically to liquid-core fiber optics having a flowing liquid core.

Fiber optics transmit light axially while confining it radially. Light is transmitted through a transparent core and confined by total internal reflectance at the interface of a core having a high index of refraction surrounded, clad, or sheathed by material of a lower index of refraction. While most fiber optic cores are solid, this is not a requirement. Liquid-core fiber optics were developed and demonstrated in the past primarily for their low transmission loss. As transmission losses through solid-core silica fibers were brought down over time, interest in liquid-core fiber optics declined.

Conventional solid-core fiber optics have been used for a number of years as sensors for determining strain, temperature and a variety of other physical parameters. Typically, a change in a particular physical parameter can be made to cause a corresponding change in the index of refraction of the fiber optic core which can then be measured by a variety of methods.

More recently, liquid-core fiber optics have been used to measure temperature. For example, Geddes et al., in U.S. Pat. No. 4,201,446, describe a liquid-core fiber optic in which the refractive index of the liquid core varies with temperature. The temperature of the substance through which the liquid-core optical fiber passes can be measured from the maximum angle of the transmitted light output from the end of the liquid-core optical fiber. Kuribara et al., in "Liquid core optical fibre for voltage measurement using Kerr effect," *Elec. Lett.*, 19, pp. 133–135, 1983, used hollow-core fibers filled with Kerr liquids for voltage measurement. Hartog, in "A distributed temperature sensor based on liquid-core optical fibers," *J. Lightwave Tech.*, LT-1, pp. 498–509, 1983, followed with a distributed temperature measurement technique that used optical time domain reflectometry (OTDR) techniques to scan the backscatter from a liquid as a function of temperature.

The possibility of flowing the liquid through an optical fiber in a liquid-core fiber optic has been explored in, for example, U.S. Pat. No. 5,165,773 to Nath. As part of his invention, Nath describes a light guide for use with an endoscope in which saline is used as the liquid core and is slowly flowed through the light guide into a body cavity, thus preventing contamination of the end of the light guide by coagulated tissue, blood or the like.

Unfortunately, the prior art has generally failed to take full advantage of all the useful possibilities from the ability of the liquid in a liquid-core fiber optic to flow through the fiber.

It is, therefore, a principal object of the present invention to provide liquid-core fiber optics that take fuller advantage of the ability of a liquid core to flow through the fiber.

It is a specific object of the present invention to provide liquid-core fiber optics that use a flowing liquid core for heat transfer between the fiber and a structural component or substance with which it is in contact.

It is a feature of the present invention that it can combine its heat exchange function with temperature and strain sensing and with any other parameter measuring features of prior art solid-core and liquid-core fiber optics.

It is an advantage of the present invention that it can provide either heating or cooling while measuring physical parameters.

These and other objects, features and advantages of the present invention will become apparent as the description of certain representative embodiments proceeds.

SUMMARY OF THE INVENTION

The present invention provides a new liquid-core fiber optic system that combines heat transfer with the prior art features of both solid and liquid-core fiber optic systems. The unique discovery of the present invention is that the liquid core of a liquid-core optical fiber can be used as a heat transfer fluid in addition to and without sacrificing its optical properties.

Accordingly, the present invention is directed to a fiber optic system comprising an optical fiber having a core suitable for passage of a liquid, a heat exchanger and a supply of transparent liquid operatively interconnected with both the optical fiber core and the heat exchanger. The invention may further comprise a pump for moving the transparent liquid between the optical fiber core and the heat exchanger. A parameter of the transparent liquid, such as its index of refraction, may be temperature sensitive. The fiber optic system may, in a system in which the temperature of the transparent liquid can be determined from the level of a temperature-sensitive parameter of the transparent liquid, further comprise a controller operatively interconnected with the heat exchanger or the pump for controlling the amount of heat transferred between the heat exchanger and the transparent liquid and a feedback loop from a selected region at least near to the optical fiber back to the controller for transmitting from that region the level of the temperature-sensitive parameter.

The present invention is also directed to a fiber optic system for modifying the temperature of a substance, comprising an optical fiber having a core suitable for passage of a liquid and a supply of transparent liquid at a different temperature from the substance operatively interconnected with the optical fiber core. The fiber optic system may further comprise a pump for moving the transparent liquid through the optical fiber core. A parameter of the transparent liquid, such as its index of refraction, may be temperature sensitive..

The present invention is further directed to a method for modifying the temperature of a substance, comprising the steps of placing an optical fiber having a core suitable for passage of a liquid in thermal contact with the substance, providing a heat exchanger, providing a supply of transparent liquid operatively interconnected with both the optical fiber core and the heat exchanger and flowing the transparent liquid through the optical fiber core to transfer thermal energy between the heat exchanger and the substance.

The present invention is yet further directed to a method for both modifying and determining the temperature of a substance comprising the steps of placing an optical fiber having a core suitable for passage of a liquid in thermal contact with the material, providing a supply of transparent, temperature-sensitive, liquid operatively interconnected with both the optical fiber core and the heat exchanger, wherein the temperature of the liquid can be measured by detecting for the level of a temperature-sensitive parameter of the transparent liquid, flowing the transparent liquid through the optical fiber core to transfer thermal energy between the heat exchanger and the substance, detecting for the level of the temperature-sensitive parameter of the transparent liquid and calculating from the level of the temperature-sensitive parameter of the transparent liquid the temperature of the substance.

The present invention is still further directed to a method for modifying the temperature of a substance comprising the steps of placing an optical fiber having a core suitable for passage of a liquid in thermal contact with the substance, providing a supply of transparent liquid at a different temperature from the substance operatively interconnected with the optical fiber core and flowing the transparent liquid through the optical fiber core to transfer thermal energy between the transparent liquid and the substance.

DESCRIPTION OF THE DRAWINGS

The present invention will be more clearly understood from a reading of the following detailed description in conjunction with the accompanying drawings wherein.

DETAILED DESCRIPTION

Figure 1:
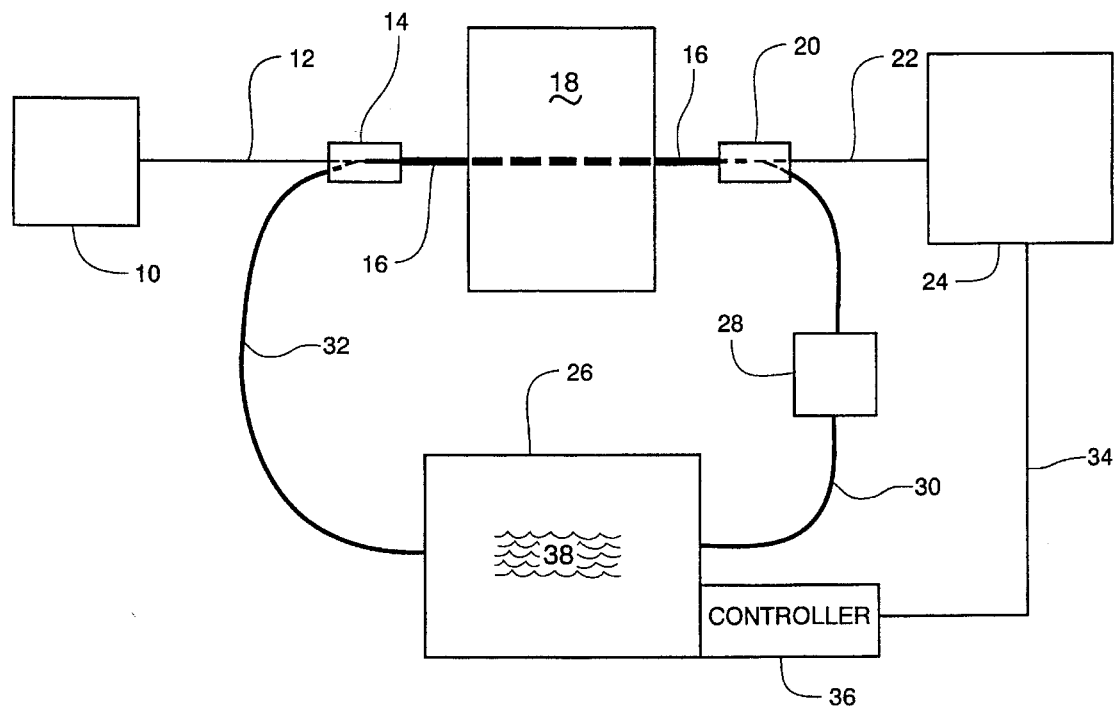
FIG. 1 is a schematic view of a liquid-core fiber optic system according to the teachings of the present invention showing the addition of a heat exchanger; and, FIG. 2 is a simplified perspective view of a solid-core-to-liquid-core coupler suitable for practicing the present invention.

Referring now to FIG. 1 of the drawings, there is shown a schematic view of a liquid-core fiber optic system according to the teachings of the present invention. A conventional laser 10 transmits light first into a first conventional solid-core optical fiber 12. Solid-core optical fiber 12 feeds into a solid-core-to-liquid-core coupler 14 which connects solid-core optical fiber 12 to a liquid-core optical fiber 16. Liquid-core optical fiber 16 extends through a structure 18 made of any arbitrary substance, including liquids and gases. Another solid-core-to-liquid-core coupler 20 connects liquid-core optical fiber 16 to a second conventional solid-core optical fiber 22. In this embodiment, solid-core optical fiber 22 feeds into a detector 24 for converting the output fiber optic signal into a measurement of temperature, strain or other parameter of structure 18.

A heat exchanger 26 is interconnected with liquid-core optical fiber 16. A pump 28 circulates a supply of transparent liquid 38 through liquid-core optical fiber 16, tubing sections 30 and 32, and heat exchanger 26. An optional feedback loop 34 from the end of detector 24 feeds a controller 36 attached to heat exchanger 26. The feedback loop may also optionally feed a controller attached to pump 28.

Figure 2:
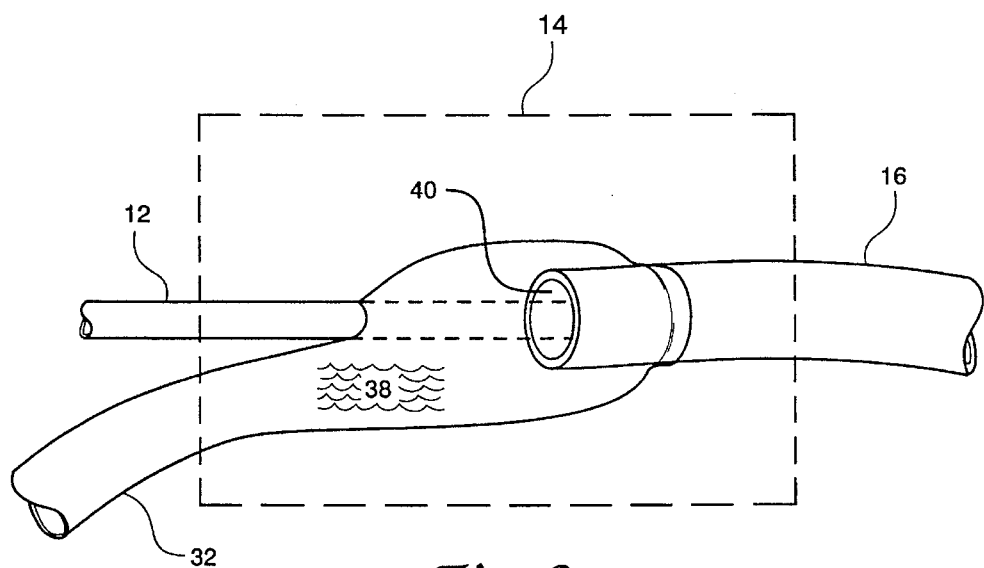

FIG. 2 shows an expanded view of solid-core-to-liquid-core coupler 14. The outer diameter of solid-core fiber 12 is about 25% of the inner diameter of a core 40 of liquid-core fiber 16 and fits inside the opening to liquid-core fiber 16. Tubing section 32 surrounds coupler 14 so that transparent liquid 38 will flow over and around the end of solid-core optical fiber 12 and through liquid-core optical fiber 16. There is about a 15% transmission loss through each coupler 14 and 20.

To use for heating or cooling, transparent liquid at a different temperature from the substance to be heated or cooled is flowed through liquid-core optical fiber 16 to heat or cool structure 18. In tests performed to date, saturated water has worked best at transferring thermal energy, or heat, between a liquid-core optical fiber and the structure in which it is embedded or otherwise in thermal contact. It has also been found that very low flow rates, even as low as a drip rate, have worked best in maximizing the amount of thermal energy transferred.

Fluids which have been tried (including, in some cases, by computer simulation) as the transparent liquid core for a liquid-core fiber optic and which have not worked as well as saturated water in transferring heat include optical grade, refractive index matching fluids, industrial grade high-temperature silicone oils, and liquid parahydrogen (for use at very low temperatures). The choice of fluid is constrained by the temperature range in which the fluid will be used. Liquid lead-bismuth has been explored for use at very high temperatures, but because liquid lead-bismuth is not transparent, it has only been used with a sensing technique that only requires illuminating the cladding of the fibers. Air has also been tried as the transparent liquid (or fluid), but with poor results. A fiber-optic sensing system using air as the transparent fluid would probably need to use illumination of the cladding similar to liquid lead-bismuth.

For most of the tests, the liquid-core fiber sensor was fabricated using a relatively inexpensive and uncomplicated process. The sensor fiber was manufactured using a hollow core silica fiber protected by either an acrylate or polyimide coating. A sapphire tube could also be used. The 125–550 μm inner diameter hollow core fiber can be commercially obtained or custom manufactured, depending on the desired tolerances. If tight tolerances are needed, the hollow core fiber can be drawn from a standard, undeposited preform that resembles a silica tube.

Heat exchanger 26 receives transparent liquid 38 after it has been heated or cooled by its passage through structure 18. Heat exchanger 26 removes or adds heat as needed so that transparent liquid 38 re-enters liquid-core optical fiber 18 at its original temperature differential from structure 18. Similarly, pump 28 may be run at different flow rates to increase or decrease the rate of heat transfer.

Detector 24 represents schematically a number of different approaches for measuring temperature or strain at the same time as heating or cooling structure 18 with flowing transparent liquid 38.

One approach is the use of an Optical Time Domain Reflectometer (OTDR). Commercially available OTDR's typically include a pulsed laser diode which is repetitively triggered by a clock circuit, a detector, a delay generator, a sampler, and a signal processor. A display oscilloscope is generally also used. The OTDR measures the time of flight of a short optical pulse in an optical fiber, launched by a pulsed laser diode and detected by a detector. OTDR's are commonly used in the telecommunications industry to locate breaks in optical fiber cables. Knowing the speed of the light pulse in the fiber, it is possible to calculate the location of a break (which reflects some of the pulse) by measuring the round trip time-of-flight of the light pulse to and from the break. An OTDR can also be used for measuring strain in an optical fiber, since the strain induces a length change in the fiber and increases the time-of-flight of a pulse propagating through the fiber. In the case of the liquid-core fiber, the OTDR can also be used to measure temperature because the temperature changes the index of refraction and decreases the time-of-flight of the optical pulse. In order to eliminate pulse drifts, the pulse location can be monitored with respect to a reference pulse that does not fluctuate in time. The reference pulse can be generated by a reflection from the air gap in the connector joining the lead-in fiber to the pulsed laser pigtail fiber. This is done to reduce the effects of jitter in the pulsed laser repetition rate. The time resolution of a typical OTDR is approximately ±2 picoseconds, primarily due to laser jitter.

Another approach for measuring temperature at the same time as heating or cooling structure 18 with flowing transparent liquid 38 uses an evanescence-based liquid fiber model based on weakly-guiding theory. For an optical fiber having a core and cladding, both of which have a linear refractive index dependence on temperature, there is a specific temperature at which the relative refractive indices for both core and cladding will reach values such that the intensity of light of a chosen wavelength traveling through the fiber will drop to near zero. The advantage of such a device is that there is no dependence on the length of the sensor fiber. If that specific temperature is reached anywhere along the fiber, the intensity of light through the fiber will drop to near zero. Because the intensity drop for these evanescence-based liquid fiber sensors is so sudden, to test for a range of temperatures a plurality of sensors need to be arranged in parallel, each with a liquid having a different index of refraction.

To date, the best use of evanescence-based liquid fiber sensors with a flowing transparent core liquid is as a threshold temperature switch for cooling. The evanescence-based liquid-based fiber is embedded inside a structure with appropriate circuitry such that, whenever the intensity of the transmitted light drops to near zero, a pump is turned on and cooled transparent core liquid flowed through the fiber for a preset period of time to return the structure to a "safe" temperature.

The disclosed liquid-core fiber optic system successfully demonstrates the advantages of combining the ability to flow the liquid in a liquid-core optical fiber with prior art uses of liquid-core optical fibers. Although the disclosed liquid-core fiber optic system is specialized, its teachings will find application in other areas where modifications, such as adding low transmission loss liquid cores, was made to prior art inventions, such as fiber optics, and then abandoned before discovering other and fuller advantages made possible by the modification. An example of a further advantage that may be obtained from the use of liquid-core optical fibers is pressurizing the liquid to bulge the fiber and impart a physical distortion on the substance through which the optical fiber passes.

The term "liquid" is used in the claims rather than the more general term "fluid" because it more clearly conveys the essence of the invention. As used in the claims, the term "liquid" is understood to have the same meaning as the more general term "fluid," which includes gases and other fluids in addition to liquids.

It will be seen by those with skill in the field of the invention that the invention does not have to be a closed-loop system, but can also be an open-loop system in which the supply of transparent liquid core heat transfer fluid is periodically or continuously replenished. Similarly, the pump used in the invention does not need to be a motor-driven mechanism, but can just as well be a gravity pump or any means to create a flow of liquid through the optical fiber. Other modifications to the invention as described may be made, as might occur to one with skill in the field of the invention, within the intended scope of the claims. Therefore, all embodiments contemplated have not been shown in complete detail. Other embodiments may be developed without departing from the spirit of the invention or from the scope of the claims.

We claim:

1. A method for controlling the temperature of a substance, comprising the steps of:
   (a) placing an optical fiber having a core suitable for passage of a liquid in thermal contact with the substance;
   (b) providing a heat exchanger in a spaced relationship from the substance;
   (c) providing a supply of transparent liquid operatively interconnected with both the optical fiber core and the heat exchanger; and,
   (d) flowing the transparent liquid through the optical fiber core to transfer thermal energy between the heat exchanger and the substance and thereby control the temperature of the substance.

2. A method for both controlling and determining the temperature of a substance, comprising the steps of:
   (a) placing an optical fiber having a core suitable for passage of a liquid in thermal contact with the material;
   (b) providing a heat exchanger in a spaced relationship from the substance;
   (c) providing a supply of transparent, temperature-sensitive, liquid operatively interconnected with both the optical fiber core and the heat exchanger, wherein the temperature of the liquid can be measured by detecting for the level of a temperature-sensitive parameter of the transparent liquid;
   (d) flowing the transparent liquid through the optical fiber core to transfer thermal energy between the heat exchanger and the substance and thereby control the temperature of the substance;
   (e) detecting for the level of the temperature-sensitive parameter of the transparent liquid; and,
   (f) calculating from the level of the temperature-sensitive parameter of the transparent liquid the temperature of the substance.

3. A method for modifying the temperature of a substance, comprising the steps of:
   (a) placing an optical fiber having a core suitable for passage of a liquid in thermal contact with the substance;
   (b) providing a supply of transparent liquid operatively interconnected with the optical fiber core, wherein the transparent liquid is at a different temperature from the temperature of the substance; and,
   (c) flowing the transparent liquid through the optical fiber core to transfer thermal energy between the transparent liquid and the substance and thereby modify the temperature of the substance to a temperature closer to that of the temperature of the transparent liquid.

* * * * *